(12) United States Patent
Comrie

(10) Patent No.: US 7,141,112 B2
(45) Date of Patent: *Nov. 28, 2006

(54) CEMENTITIOUS MATERIALS INCLUDING STAINLESS STEEL SLAG AND GEOPOLYMERS

(76) Inventor: Douglas C Comrie, 4281 Meadowlark Trail, Stow, OH (US) 44224

( * ) Notice: Subject to any disclaimer, the term of this patent is extended or adjusted under 35 U.S.C. 154(b) by 0 days.

This patent is subject to a terminal disclaimer.

(21) Appl. No.: 11/085,478

(22) Filed: Mar. 21, 2005

(65) Prior Publication Data

US 2005/0160946 A1    Jul. 28, 2005

Related U.S. Application Data

(63) Continuation-in-part of application No. 10/769,147, filed on Jan. 30, 2004, now Pat. No. 6,869,473.

(51) Int. Cl.
*C04B 14/00*    (2006.01)
*C04B 18/06*    (2006.01)

(52) U.S. Cl. .................. 106/697; 106/714; 106/789; 106/790; 106/707; 106/713

(58) Field of Classification Search ................ 106/697, 106/714, 789, 790, 707, 713
See application file for complete search history.

(56) References Cited

U.S. PATENT DOCUMENTS 5,820,668 A * 10/1998 Comrie ..................... 106/600
6,258,162 B1 * 7/2001 Kawakami et al. ......... 106/810
6,869,473 B1 * 3/2005 Comrie ..................... 106/697

* cited by examiner

*Primary Examiner*—Elizabeth D. Wood
(74) *Attorney, Agent, or Firm*—Harness, Dickey & Pierce, PLC

(57) ABSTRACT

Cementitious materials including stainless steel slag and geopolymer can be added to conventional cement compositions, such as Portland cement, as a partial or total replacement for conventional cement materials. The stainless steel slag may comprise silicates and/or oxides of calcium, silicon, magnesium, iron, aluminum, manganese, titanium, sulfur, chromium and/or nickel. The geopolymer may comprise aluminum silicate and/or magnesium silicate. In a preferred embodiment, curing of concrete materials by the action of water on the cementitious materials is enhanced with the addition of an activator component selected from calcium bromide, calcium nitrate, calcium nitrite, calcium chloride, calcium oxide, and sodium bromide.

23 Claims, No Drawings

CEMENTITIOUS MATERIALS INCLUDING STAINLESS STEEL SLAG AND GEOPOLYMERS

CROSS-REFERENCE TO RELATED APPLICATIONS

This application is a continuation-in-part of co-pending U.S. Ser. No. 10/769,147 filed on Jan. 30, 2004, now U.S. Patent No. 6,869,473, the disclosure of which is incorporated herein by reference in its entirety.

FIELD OF THE INVENTION

The present invention relates to cementitious materials, and more particularly relates to the use of mixtures of stainless steel slag and a geopolymer as partial or total substitutes for cements for use in concrete and the like.

BACKGROUND

Portland cements are hydraulic cements that chemically react and harden with the addition of water. Portland cement contains limestone, clay, cement rock and iron ore blended and heated to a temperature of about 2600–3000° F. The resulting product is subsequently ground to a powder consistency and mixed with gypsum to control setting time. Portland cement is used in many architectural, masonry and construction applications, most notably as concrete for roads, runways, slabs, floors, walls, precast structures and the like.

Architectural and construction applications such as roads, bridges, commercial and residential buildings and waterway systems that require a significant amount of cement-based concrete would benefit from a lower cost cementitious material that reduces or eliminates the dependency on the availability of limestone, clay, cement rock and iron ore. For example, U.S. Pat. No. 5,820,668, which is incorporated herein by reference, discloses inorganic binder compositions that may be used as partial substitutes or total replacements for Portland cement for such applications. The inorganic binder compositions include materials such as fly ash, $Al_2O_3$, pozzolan, nepheline syenite, aluminum silicate, sodium hydroxide, silicic acid, potassium salt and sodium salt.

Architectural and construction applications that are subjected to increased fatigue stresses, acid rain and/or road salt, such as roads, bridges, transportation facilities and high-rise applications, would further benefit from a cementitious material having improved durability, acid resistance and improved rapid chloride ion penetrability. With the growing popularity of cement-alternative compositions and the desire to re-use manufacturing by-products such as stainless steel slag, a cementitious material that incorporates a manufacturing by-product material and exhibits improved properties is highly desirable. Accordingly, a need remains for a cost effective environmentally friendly cementitious material that incorporates stainless steel slag and exhibits improved durability, acid resistance and improved rapid chloride ion penetrability.

The present invention has been developed in view of the foregoing.

SUMMARY

The present invention is directed to a cementitious material including stainless steel slag and geopolymer that can be added to conventional hydraulic cement compositions, such as Portland cement, as a partial or total replacement for conventional cement materials.

It is an aspect of the present invention to provide a cementitious material comprising a geopolymer and stainless steel slag.

It is another aspect of the present invention to provide a cementitious material comprising hydraulic cement, stainless steel slag and a geopolymer.

It is another aspect of the present invention to provide a reacted mixture of a geopolymer, stainless steel slag and water.

It is yet another aspect of the present invention to provide a method of making reacted cementitious material, the method comprising combining hydraulic cement, stainless steel slag, geopolymer and water.

These and other aspects of the present invention will be more apparent from the following description.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DESCRIPTION

In one embodiment, the invention provides a cementitious material containing a geopolymer and stainless steel slag, and optionally further containing conventional cement materials such as Portland cement. In various embodiments, the material contains an activator component comprising at least one of calcium bromide, calcium nitrate, calcium nitrite, calcium chloride, calcium oxide, and sodium bromide, wherein said activator component or components are added as separate ingredients to the material. The material is prepared by combining compositions comprising the geopolymer, stainless steel slag, and optional conventional cement material in admixture. In a preferred embodiment, the activator component is added to the composition containing the geopolymer prior to combining the compositions containing the geopolymer, stainless steel slag, and optional conventional cement material such as Portland cement to form the cementitious material.

In another embodiment, the invention provides a reacted mixture of the geopolymer, stainless steel slag and water, and further containing one of the activator components described above. In various embodiments, the reacted mixture further comprises a conventional cement such as Portland cement. The reacted mixtures are made by combining a binder with aggregate and water, and allowing the combined materials to cure to a reacted material with high compressive strength. The binder is made of the geopolymer, stainless steel slag, and optional conventional cement such as Portland cement.

To illustrate, a cementitious material as described above is used as a binder in a concrete mixture that contains the cementitious material and aggregate material such as sand and gravel. Ready mix concrete compositions are also provided that contain the concrete mixture and water. As is known in the art, ready mix concrete compositions are poured into molds and allowed to cure or set by the action of water on the binder materials of the composition to form a reacted cementitious material comprising the reacted mixture noted above. The reacted mixture takes the form of a variety of manufactured articles useful in a variety of architectural and construction applications. Manufactured articles made by curing of the compositions include without limitation bridge decks, construction columns, roadways, curbs, building blocks, culverts, pipes, and so on. In various embodiments, the cement and concrete compositions of the invention provide advantages such as improved compressive strength and/or faster strength development (faster cure).

In one aspect, the invention provides an improved method of making a reacted cementitious material by combining water, optional aggregate, stainless steel slag, geopolymer, and optional hydraulic cement such as Portland cement to form a reactive mixture. The improvement involves providing the reactive mixture with one or more of an activator component selected from the group consisting of calcium bromide, calcium nitrate, calcium nitrite, calcium chloride, calcium oxide, and sodium bromide. In various embodiments, the improvements involve faster curing time (fast compressive strength development) and/or higher compressive strength.

The cementitious materials of the present invention include stainless steel slag and geopolymer. As used herein, the term "cementitious material" means a water-activated binding material that hardens subsequent to or simultaneous with activation. In various embodiments, mixtures of stainless steel slag and geopolymer are added to conventional hydraulic cement compositions, such as Portland cement, as partial substitutes for conventional cement materials. Alternatively, the stainless steel slag and geopolymer mixtures may be used as total replacements for conventional cement materials.

Stainless steel slag is a by-product of the stainless steel-making process. The production of stainless steel requires that certain alloying elements must be added to a molten steel composition. Impurities resulting from the added alloying elements and any impurities present in the molten steel composition are removed from the stainless steel production furnace to produce a commercial grade stainless steel. Stainless steel slag comprises the impurities from the steel and/or additional alloying elements removed as by-products from the stainless steel production furnace. The slag typically occurs as a molten liquid melt and is a complex solution of silicates and oxides that solidifies upon cooling. The stainless steel slag may comprise silicates, oxides and other compounds of calcium, silicon, magnesium, iron, aluminum, manganese, titanium, sulfur, chromium and nickel. For example, the stainless steel slag may comprise calcium silicate and/or calcium oxide. In one embodiment, the stainless steel slag may comprise from about 80 to about 99 weight percent calcium silicate. In a non-limiting example, a typical stainless steel slag composition contains from about 0.2 weight percent to about 50 weight percent Ca; from about 0.5 weight percent to about 65 weight percent Si; from about 0.1 weight percent to about 5 weight percent Mg; from about 0.1 weight percent to about 6 weight percent Fe; from about 1 weight percent to about 40 weight percent Al; from about 0.1 weight percent to about 1 weight percent Mn; from about 0.1 weight percent to about 0.5 weight percent Ti; from about 0.01 weight percent to about 2.5 weight percent S; from about 0.3 weight percent to about 5 weight percent Cr; and from about 0.01 weight percent to about 1 weight percent Ni. In another embodiment, the stainless steel slag contains about 30 weight percent Ca; about 12 weight percent Si; about 7 weight percent Mg; about 4 weight percent Fe; about 3 weight percent Al; about 1 percent Mn; about 0.5 weight percent Ti; about 0.2 weight percent Cr and about 0.04 weight percent Ni.

The stainless steel slag is generally cooled and provided in relatively fine particulate form. If desired, grinding or milling may be used to reduce the particle size of the slag, e.g., to a size approximating the particle size of Portland cement. In one embodiment, the stainless steel slag has an average particle size of from about 100%–200 mesh to about 45%–325 mesh. Preferably, the stainless steel slag has an average particle size of from about 80%–325 mesh to about 95%–325 mesh. In one embodiment, the stainless steel slag has an average particle size of less than about 100 micrometers. In another embodiment, the stainless steel slag has an average particle size of from about 1 micrometer to about 50 micrometers. The stainless steel slag may be provided in the form of a gray powder having a typical specific gravity of about 2.8.

In addition to stainless steel slag, the present cementitious materials include a geopolymer. The term "geopolymer" includes amorphous to semi-crystalline materials comprising aluminum silicate and/or magnesium silicate either as a solid or when reacted with water. The geopolymer is a cement that forms an extended inorganic polymer network upon reaction with water. The geopolymer may be provided as a powder, a liquid or as a powder and a liquid that must be combined. As used here, geopolymer means cement-like materials other than conventional hydraulic cements. Examples of conventional cements excluded by the term geopolymer include Portland cement, type K cement, and mortar cement. In various embodiments, the geopolymer is a mixture of components comprising one or more of pozzolan, fly ash F, fly ash C, nepheline syenite, and fumed silica.

In a preferred embodiment, an activator component is provided as a component of the composition containing the geopolymer. In various embodiments, the activator comprises at least one of calcium bromide, calcium nitrate, calcium nitrite, calcium chloride, calcium oxide, and sodium bromide. In various embodiments, the activator further comprises one or more of silicic acid, sodium salt, and potassium salt. Sodium salt refers to sodium silicate and potassium salt to potassium silicate.

To illustrate, one type of geopolymer comprises pozzolan, anhydrous aluminum silicate, silicic acid and a potassium and/or sodium salt. Pozzolan typically comprises aluminum oxide and silicon oxide. Another type of geopolymer comprises fly ash, pozzolan, silicic acid and a potassium and/or sodium salt. Another type of geopolymer comprises pozzolan, nepheline syenite, hydrous aluminum silicate, hydrous sodium hydroxide, silicic acid and potassium and/or sodium salt. Yet another type of geopolymer comprises fly ash, fumed silica and aluminum oxide.

One type of geopolymer comprises from about 5 to about 20 weight percent fumed silica or pozzolan; from about 40 to about 60 weight percent anhydrous aluminum silicate; from about 1 to about 25 weight percent silicic acid; and from about 1 to about 25 weight percent potassium salt and/or sodium salt. In another embodiment, the geopolymer may further include a poly(sialate) and/or a poly(sialate-siloxo) admixed with one or more of: fly ash F; fly ash C; fumed silica; $Al_2O_3$; pozzolan; nepheline syenite; anhydrous aluminum silicate; hydrous aluminum silicate; hydrous sodium hydroxide; silicic acid; potassium salt; and sodium salt to form a poly(sialate) and/or poly(sialate-siloxo) admixture. In another embodiment, the geopolymer comprises from about 3 weight percent to about 15 weight percent poly(sialate) and/or poly(sialate-siloxo) admixture. In yet another embodiment, the geopolymer comprises from about 10 weight percent to about 15 weight percent poly (sialate) and/or poly(sialate-siloxo) admixture. Some examples of geopolymers are listed in Examples 1–5 below. In some of the examples, the geopolymer is provided as a solid powder constituent, in other examples the geopolymer is provided in part as a solid powder constituent and in part a liquid constituent. For example, geopolymers comprising silicic acid and potassium and/or sodium salt typically comprise these constituents in liquid form. The values listed in Examples 1–5 are weight percentages.

In various embodiments, the cementitious material containing geopolymer and stainless steel slag contains an activator component, preferably at a level that improves the cure characteristics of the material. In one embodiment, the material contains from 0.01 to about 10% by weight of one or more activator components selected from the group consisting of calcium bromide, calcium nitrate, calcium nitrite, calcium chloride, and sodium bromide. Preferably, the activator content is at least 0.1% and more preferably at least 0.5%. In various embodiments, the content of activator is less than or equal to 5%. Mixtures of the activators noted above can also be used. In various embodiments, from 0.5 to 5%, preferably from 1 to 4% each of one or more of the activators is provided. In addition to or in place the activators noted above, the cementitious material in various embodiments is provided with from about 0.1 up to about 40% by weight of calcium oxide, preferably up to about 30% and more preferably up to about 20%. Although the theory of activation does not limit the invention, it is believed that calcium oxide serves both as an activator for curing the mixtures containing geopolymer, stainless steel slag, and optional Portland cement and as a curing component of pozzolan or other cement components other than Portland cement that require calcium oxide for curing.

The activator component can be provided into the cementitious material in various ways. In one preferred embodiment, the activator is provided in admixture in the composition containing the geopolymer. In this aspect, the activators can partially or completely replace and substitute for the silicic acid, sodium salt, and potassium salt in compositions described above. Alternatively, the activators can be provided in admixture in compositions containing the stainless steel slag. The activator components can also be provided as a separate composition that is then combined in admixture with compositions containing the geopolymer and/or the stainless steel slag. Finally, the activators can be provided in admixture in compositions that contain conventional cements such as Portland cement. Combinations of the above procedures can also be used. The activators can be added to any of the compositions either as a dry component or a liquid, the latter being usually in the form of a water solution.

In a further embodiment, the water soluble activators selected from calcium bromide, calcium nitrate, calcium nitrite, calcium chloride, calcium oxide, and sodium bromide are added as part of the water used to produce the ready mix compositions and reacted mixtures described above. In this way, reacted mixtures comprising one or more of the activators are produced.

EXAMPLE 1

4–10% pozzolan;
5–10% anhydrous aluminum silicate;
1–5% silicic acid; and
1–5% potassium salt.

EXAMPLE 2

5–20% fly ash C;
4–10% pozzolan;
1–5% silicic acid; and
1–5% potassium and/or sodium salt.

EXAMPLE 3

4–10% pozzolan;
4–10% nepheline syenite;
1–5% hydrous aluminum silicate;
1–5% hydrous sodium hydroxide;
1–5% silicic acid; and
1–5% potassium and/or sodium salt.

EXAMPLE 4

5–20% fly ash F;
4–10% fumed silica; and
1–8% $Al_2O_3$.

EXAMPLE 5

4–10% pozzolan;
5–10% anhydrous aluminum silicate;
1–5% silicic acid; and
1–5% sodium salt.

In one embodiment, a geopolymer composition containing constituents described above and illustrated in a non-limiting fashion in Examples 1–5 is combined with desired amounts of stainless steel slag to form a cementitious material comprising a slag-geopolymer mixture In another embodiment, the amounts of geopolymer constituents listed in Examples 1–5 are combined with desired amounts of stainless steel slag, and conventional cement (e.g., Portland cement) in order to produce a cementitious material The weight percentages listed in Examples 1–5 represent the geopolymer portion of the cementitious material, with the balance comprising stainless steel slag and optionally conventional cement, aggregate and/or other materials. In various embodiments, an activator component selected from the group consisting of calcium bromide, calcium nitrate, calcium nitrite, calcium chloride, calcium oxide, and sodium bromide is added into the cementitious material in admixture with one or more of the composition containing the geopolymer, the composition containing the stainless steel slag, and the composition containing the optional conventional cement such as Portland cement. In these embodiments, the cementitious material contains 0.01 to 10% by weight of the activators exclusive of calcium oxide. The cementitious material contains from 0 to 40% by weight of calcium oxide.

The amounts of geopolymer and stainless steel slag present in the slag-geopolymer mixture are listed below in Table 1. The values listed in Table 1 are weight percentages.

TABLE 1

Stainless Steel Slag-Geopolymer Mixture

|  | Geopolymer (wt %) | Stainless Steel Slag (wt %) |
| --- | --- | --- |
| Typical Range | 1–99.9 | 0.1–99 |
| Preferred Range | 5–95 | 5–95 |
| More Preferred Range | 10–50 | 50–90 |
| Most Preferred Range | 15–40 | 60–85 |

According to one embodiment of the invention, the slag-geopolymer mixture may be added to a conventional hydraulic cement material, such as Portland cement, to form a cement-slag-geopolymer mixture. In one embodiment, the Portland cement comprises about 20 weight percent silicon dioxide; about 60 weight percent tri-calcium silicate; about 10 weight percent di-calcium silicate; about 6 weight percent tri-calcium aluminate; about 1 weight percent aluminum oxide; about 1 weight percent ferric oxide; about 1 weight percent magnesium oxide; and about 1 weight percent sulphur tri-oxide. The cement material may also comprise any composition conventionally known in the art. Portland cement, or any other suitable type of cement, may be combined with the slag-geopolymer mixture in the weight percentages listed in Table 2.

TABLE 2

Cement-Slag-Geopolymer Mixture

| | conventional cement (wt. %) | Slag-Geopolymer Mixture (wt. %) |
|---|---|---|
| Typical Range | 0–99.99 | 0.1–100 |
| Preferred Range | 20–90 | 10–80 |
| More Preferred Range | 40–85 | 15–60 |
| Most Preferred Range | 50–80 | 20–50 |

The cementitious material comprising the cement-slag-geopolymer material listed in Table 2 may be combined with water and used as a binder material for any suitable application. For example, the cementitious material may be combined with sand and/or aggregate to form a concrete mixture. For clarity, sand is referred to as fine aggregate, while coarser materials such as stone, gravel and/or ground granulated blast furnace slag is referred to as coarse aggregate. Any suitable ratio of cement-slag-geopolymer material to sand and/or aggregate that corresponds to suitable ratios of cement to sand and/or aggregate typically known in the art may be used. In one embodiment, the concrete material may comprise from about 10 weight percent to about 30 weight percent cement-slag-geopolymer mixture, with the remainder comprising sand, aggregate and/or other additional ingredients such as plasticizers and fibers. In another embodiment, the concrete material may comprise from about 10 weight percent to about 20 weight percent cement-slag-geopolymer mixture. A typical ratio of sand to aggregate in concrete mixtures is about 2:3. A typical ratio of sand and/or aggregate to cement-slag-geopolymer mixture is from about 6:1 to about 3:1. However, any other suitable ratio of sand and aggregate may be used.

Any plasticizer typically known in the art may be used, however, a particularly preferred plasticizer is Adva 100 manufactured by Grace Products. When a plasticizer is added, it may be added in an amount of from about 4 to about 10 ml of plasticizer per kilogram of cement-slag-geopolymer mixture. In one embodiment, ground granulated blast furnace slag may be added in an amount of from about 15 weight percent to about 50 weight percent. Ground granulated blast furnace slag is slag produced from a primary blast furnace that is typically quenched with water, pelletized and re-quenched with water. Water may also be added to the cement-slag-geopolymer mixture in any desired amount, for example, in one embodiment, the ratio of water to cement-slag-geopolymer mixture may be from about 0.3:1 to about 0.6:1.

In Examples 6–9, geopolymer, stainless steel slag and Portland cement, each having approximately the same particle size, were mixed together in a blending apparatus to form a dry mixture. Dry sand and stone were then introduced and combined with the dry mixture and water was added to the mixture to form a slurry. The ratio of the water to the cement-slag-geopolymer mixture was about 0.35:1. The slurry was mixed for three minutes and injected into tube molds having a diameter of 4 inches and a height of 8 inches. The tubes were then cured by air-drying for a period of 28 days and strength measurements were taken at various times during the curing period as set forth in Examples 6–9. Examples 6–10 illustrate concrete mixtures and reacted mixtures containing various combinations of silicic acid, sodium salt, and potassium salt as activators, and not containing added calcium bromide, calcium nitrate, calcium nitrite, calcium chloride, calcium oxide, or sodium bromide.

EXAMPLE 6

In Example 6, a first set of three concrete formulations was tested in a Triaxial Compressive Machine to obtain strength measurements after 24 hours of air-drying cure time. The formulation in each tube replaced a percentage of Portland cement typically required to form concrete with a slag-geopolymer mixture. Each of the tubes comprised a slag-geopolymer mixture comprising 10% geopolymer and stainless steel slag at 41%–325 mesh. The cement-slag-geopolymer content of the samples was about 13.5% by weight.

The first tube comprised a cement-slag-geopolymer composition comprising 70% Portland cement and 30% slag-geopolymer mixture. The first tube recorded a strength measurement of 52.02 MPa after a 24-hour curing time. The second tube comprised a cement-slag-geopolymer composition comprising 65% Portland cement and 35% slag-geopolymer mixture. The second tube recorded a strength measurement of 54.29 MPa after a 24-hour curing time. The third tube comprised a cement-slag-geopolymer composition comprising 60% Portland cement and 40% slag-geopolymer mixture. The third tube recorded a strength measurement of 50.00 MPa after a 24-hour curing time.

A second set of three tubes having the identical formulations as the first set was also tested to obtain strength measurements after 28 days of curing time. The first tube tested after the 28 day curing time recorded a strength measurement of 58.56 MPa. The second tube tested after the 28 day curing time recorded a strength measurement of 60.54 MPa. The third tube tested after the 28 day curing time recorded a strength measurement of 52.22 MPa. Cement compositions using 100% Portland cement and 0% slag-geopolymer mixture typically have a strength of about 18.5 MPa after a 24 hour curing period and a strength of about 48.9 MPa after a 28 day curing period. The results of Example 6 are shown below in Table 3.

TABLE 3

High Early Strength Concrete With Partial Substitutes for Portland Cement

| % Slag-Geopolymer Mixture | % Portland Cement | 24 Hour Strength (MPa) | 28 Day Strength (MPa) |
|---|---|---|---|
| 30 | 70 | 52.02 | 58.56 |
| 35 | 65 | 54.29 | 60.54 |
| 40 | 60 | 50.00 | 52.22 |

EXAMPLE 7

In Example 7, the strength of a concrete composition comprising 100% Portland cement was measured and compared to the strength of a concrete composition comprising 75% Portland cement and a slag-geopolymer mixture having 5 weight percent geopolymer and 20 weight percent stainless steel slag. Tubes having the above described compositions were measured after 24 hours of curing time, 4 days of curing time, 7 days of curing time and 28 days of curing time. The cement-slag-geopolymer content of each tube was about 15% by weight. The results of Example 7 are shown below in Table 4.

TABLE 4

Normal Strength Concrete Comprising 100% Portland Cement vs. Concrete Comprising 5% Geopolymer plus 20% Stainless Steel Slag

| Cementitious Material | 24 Hour Strength (MPa) | 4 day Strength (MPa) | 7 day Strength (MPa) | 28 day Strength (MPa) |
|---|---|---|---|---|
| 25% Portland Cement and 5% Geopolymer Plus 20% Stainless Steel Slag Composition | 17.0 | 35.0 | 40.0 | 52.8 |
| 100% Portland Cement Composition | 18.5 | 38.3 | 41.3 | 48.9 |

EXAMPLE 8

Example 8, the strength of a first concrete composition comprising 60% Portland cement and 40% ground granulated blast furnace slag was measured and compared to the strength of a second concrete composition comprising 50% Portland cement and a slag-geopolymer composition having 10% geopolymer and 40% stainless steel slag. Tubes having the above described first and second compositions were measured after 24 hours of curing time, 3 days of curing time, 7 days of curing time and 28 days of curing time. The cement-slag-geopolymer content of each tube was about 17% by weight. The results of Example 8 are shown below in Table 5.

TABLE 5

Medium Strength Concrete: 50% Portland Cement and 10% Geopolymer with 40% Stainless Steel Slag vs. 60% Portland Cement with 40% Ground Granulated Blast Furnace Slag

| Cementitious Material | 24 Hour Strength (MPa) | 3 day Strength (MPa) | 7 day Strength (MPa) | 28 day Strength (MPa) |
|---|---|---|---|---|
| 25% Portland Cement and 5% Geopolymer Plus 20% Stainless Steel Slag | 17.0 | 35.5 | 40.5 | 63.7 |
| 60^ Portland cement with 40% Ground granulated Blast Furnace Slag | 8.5 | 22.1 | 37.9 | 64.3 |

In Example 9, the strength of a first concrete composition comprising 100% Portland cement and 10 mL plasticizer per kg cement was measured and compared to the strength of a second concrete composition comprising 62.5% Portland cement and a slag-geopolymer composition having 12.5% geopolymer and 25% stainless steel slag. Tubes having the above described first and second compositions were measured after 24 hours of curing time, 3 days of curing time, 7 days of curing time and 28 days of curing time. The cement-slag-geopolymer content of each tube was about 17% by weight. The results of Example 9 are shown below in Table 6.

TABLE 6

High Ultimate Strength Concrete: 12.5 Geopolymer plus 25% stainless steel slag vs Normal Portland cement with plasticizer

| Cementitious Material | 24 Hour Strength (MPa) | 3 day Strength (MPa) | 7 day Strength (MPa) | 28 day Strength (MPa) |
|---|---|---|---|---|
| 62.5 Portland Cement with 12.5 Geopolymer plus 25% Stainless Steel Slag | 29.4 | 35.0 | 40.0 | 52.8 |
| 100% Portland Cement | 8.5 | 22.1 | 37.9 | 64.3 |

EXAMPLE 10

In Example 10, two concrete formulations were each tested after curing for a period of 28 days by placing each of the tubes in a saline cell comprising distilled water and a saturated sodium chloride solution. A current was passed across each sample and the conductivity, or rapid chloride ion penetrability, was measured. The first formulation comprised 65% Portland cement with 10% Geopolymer and 25% stainless steel slag and the second formulation comprised 100% Portland cement. The cementations content of the samples was about 17% by weight. The results of Example 10 are shown below in Table 7.

TABLE 7

Rapid Chloride Ion Penetration: 65% Portland cement with 10% Geopolymer and 25% Stainless Steel Slag vs. 100% Portland Cement

| Cementitious Material | Coulombs Passed After 28 day Curing Period |
|---|---|
| Portland Cement with 10% Geopolymer and 25% Stainless Steel Slag | 650 - rating = very low |
| 100% Portland Cement | 4900 - rating = high |

Examples 11–14 illustrate various embodiments of compositions containing one or more activator compounds selected from the group consisting of calcium bromide, calcium nitrate, calcium nitrite, calcium chloride, calcium oxide, and sodium bromide. The compositions are illustrated where the activator compounds are present in admixture in the geopolymer composition. The numbers in Examples 11–14 are the ranges in % by weight of each component in the geopolymer/stainless steel slag/conventional cement mixture. A wide range of values is provided to account for alternative compositions of geopolymer and a range of the levels of geopolymer, slag, and conventional cement in the cementitious material.

EXAMPLE 11

| | |
|---|---|
| Pozzolan | 5–70 |
| Anhydrous Aluminum Silicate | 5–10 |
| Silicic Acid | 1–5 |
| Potassium or Sodium Salt | 1–5 |
| Calcium Nitrate | 0.1–5 |
| Calcium Nitrite | 0.1–5 |

EXAMPLE 12

| | |
|---|---|
| Pozzolan | 0–80 |
| Calcium Oxide | 1–40 |
| Silica Fume | 1–40 |
| Fly Ash (type F or type C) | 1–10 |
| Calcium Nitrite | 0.1–5 |
| Calcium Nitrate | 0.1–5 |

EXAMPLE 13

| | |
|---|---|
| Pozzolan | 10–80 |
| Silica Fume | 0–10 |
| Fly Ash (F or C) | 0–80 |
| $Al_2O_3$ | 0–10 |
| Calcium Oxide | 1–40 |
| Calcium Nitrate | 0–5 |
| Calcium Nitrite | 0–5 |
| Calcium Bromide | 0.1–10 |

EXAMPLE 14

| | |
|---|---|
| Pozzolan | 5–80 |
| Silicic Acid | 1–20 |
| Sodium/Potassium Salt | 1–20 |
| one or more activator compounds | 0.1–20 |
| Silica Fume | 1–20 |

Dry activated synthetic cement mixes are illustrated in Examples 15–17. The development of compressive strength in psi of a series of reacted mixtures according to the invention is compared to that developed when only Portland cement is used (i.e., when the stainless steel slag and geopolymer components of each Mix "A" is replaced with Portland cement. The compressive strength, measured in psi, is measured according to industry standard methods.

EXAMPLE 15

| MIX "A" | |
|---|---|
| Portland cement | 18.9 lbs |
| Stainless steel slag | 5.4 lbs |
| Geopolymer[1] | 2.7 lbs |
| Plasticizer | 9.75 oz/cwt. |
| Water | 8.58 lbs |
| Coarse aggregate | 73.8 lbs |
| Fine aggregate | 49.2 lbs |

[1]The geopolymer has the following constituents:

| | |
|---|---|
| Calcined kaolin clay | 5% |
| Type C Fly Ash | 61% |
| Silica Fume | 10% |
| Calcium Nitrite | 2% |
| Calcium Nitrate | 2% |
| Calcium Oxide | 20% |
| Total | 100% by weight |

Development of compressive strength is given in the Table:

| Mix Type | 1 Day | 3 Day | 7 Day | 14 Day | 28 Day |
|---|---|---|---|---|---|
| Portland Cement Only | 2527 | 4100 | 4773 | 5477 | 6005 |
| Example 15 | 3523 | 5036 | 5903 | 6600 | 7180 |

EXAMPLE 16

| MIX "A" | |
|---|---|
| Portland cement | 27 lbs |
| Stainless steel slag | 2.73 lbs |
| Geopolymer[2] | 1.37 lbs |
| Plasticizer | 9.75 oz/cwt. |
| Water | 9.50 lbs |
| Coarse aggregate | 73.8 lbs |
| Fine aggregate | 49.2 lbs |

[2]The geopolymer has the following constituents:

| | |
|---|---|
| Calcined kaolin clay | 5% |
| Type C Fly Ash | 61% |
| Silica Fume | 10% |
| Calcium Nitrite | 2% |
| Calcium Nitrate | 2% |
| Calcium Oxide | 20% |
| Total | 100% by weight |

Development of compressive strength is given in the Table:

| Mix Type | 1 Day | 3 Day | 7 Day | 14 Day | 28 Day |
|---|---|---|---|---|---|
| Portland Cement Only | 2577 | 4313 | 5063 | 5915 | 6220 |
| Example 16 | 3153 | 5783 | 6363 | 6910 | 7215 |

EXAMPLE 17

| MIX A | |
|---|---|
| Portland cement | 18.9 lbs |
| SS Slag | 5.4 lbs |
| Geopolymer[3] | 2.7 lbs |
| Super Plasticizer | 9.75 oz/cwt |
| Water | 10.27 lbs |
| Coarse aggregate | 73.8 lbs |
| Fine aggregate | 49.2 lbs |

[3]The geopolymer has the following constituents:

| | |
|---|---|
| Calcined kaolin clay | 5% |
| Type C Fly Ash | 61% |
| Silica Fume | 10% |
| Calcium Nitrite | 1% |
| Calcium Nitrate | 1% |
| Calcium Bromide | 2% |
| Calcium Oxide | 2% |
| Total | 100% by weight |

Development of compressive strength is given in the Table:

| Mix Type | 1 Day | 3 Day | 7 Day | 14 Day | 28 Day |
|---|---|---|---|---|---|
| Portland Cement Only | 2710 | 4127 | 4730 | 5290 | 5980 |
| Example 17 | 3005 | 5560 | 6110 | 6970 | 7170 |

Whereas particular embodiments of this invention have been described above for purposes of illustration, the invention is not to be limited to the disclosed embodiments. It will be evident to those skilled in the art upon reading the description that numerous variations and modifications can be made without departing from the invention as defined in the appended claims.

I claim:

1. A cementitious material comprising a geopolymer and stainless steel slag, further comprising at least one activator component selected from the group consisting of calcium bromide, calcium nitrate, calcium nitrite, calcium chloride, calcium oxide, and sodium bromide.

2. The cementitious material of claim 1, wherein the geopolymer comprises aluminum silicate.

3. The cementitious material of claim 1, wherein the geopolymer comprises magnesium silicate.

4. The cementitious material of claim 1, wherein the geopolymer comprises a cement-like material selected from the group consisting of pozzolan, fly ash C, fly ash F, and fumed silica.

5. The cementitious material of claim 1, wherein the geopolymer comprises fly ash, fumed silica and aluminum oxide.

6. The cementitious material of claim 1, wherein the geopolymer comprises at least one of a polysialate and a polysialate-siloxo.

7. The cementitious material of claim 1, wherein the stainless steel slag comprises from about 0.2 weight percent to about 50 weight percent Ca and from about 0.5 weight percent to about 65 weight percent Si.

8. The cementitious material of claim 7, wherein the stainless steel slag further comprises from about 0.1 weight percent to about 5 weight percent Mg, from about 0.1 weight percent to about 6 weight percent Fe, from about 0.1 weight percent to about 1 weight percent Mn, from about 0.1 weight percent to about 0.5 weight percent Ti, from about 0.01 weight percent to about 2.5 weight percent S, from about 0.3 weight percent to about 5 weight percent Cr, and from about 0.01 weight percent to about 1 weight percent Ni.

9. The cementitious material of claim 1, wherein the stainless steel slag has an average particle size of less than about 100 micrometers.

10. The cementitious material of claim 1, wherein the stainless steel slag has an average particle size of from about 1 to about 50 micrometers.

11. The cementitious material of claim 1, further comprising Portland cement.

12. In a method of making reacted cementitious material, the method comprising combining stainless steel slag, geopolymer, optional hydraulic cement, and water to form a reactive mixture, the improvement comprising providing the reactive mixture with at least one added activator component selected from the group consisting of calcium bromide, calcium nitrate, calcium nitrite, calcium chloride, calcium oxide, and sodium bromide.

13. A method according to claim 12, wherein the reactive mixture comprises Portland cement.

14. A method according to claim 12, wherein the reactive mixture comprises 0.01–10% by weight of an activator component selected from the group consisting of calcium bromide, calcium nitrate, calcium nitrite, calcium chloride, sodium bromide, and combinations thereof, and 0–40% by weight of calcium oxide.

15. A reacted mixture of a geopolymer, stainless steel slag and water, comprising at least one activator component selected from the group consisting of calcium bromide, calcium nitrate, calcium nitrite, calcium chloride, calcium oxide, and sodium bromide.

16. A reacted mixture according to claim 15, comprising calcium bromide.

17. A reacted mixture according to claim 15, comprising calcium nitrate, calcium nitrite, or a combination of both.

18. A reacted mixture according to claim 15, wherein the geopolymer comprises a silicate material.

19. A reacted mixture according to claim 15, wherein the geopolymer comprises at least one material selected from the group consisting of fly ash F, fly ash C, pozzolan, and fumed silica.

20. A reacted mixture according to claim 15, further comprising hydraulic cement.

21. A reacted mixture according to claim 15, further comprising Portland cement.

22. A concrete construction material comprising a reacted mixture according to claim 15.

23. A manufactured article comprising a reacted mixture according to claim 15.

* * * * *

UNITED STATES PATENT AND TRADEMARK OFFICE
CERTIFICATE OF CORRECTION

PATENT NO. : 7,141,112 B2
APPLICATION NO. : 11/085478
DATED : June 18, 2007
INVENTOR(S) : Douglas C. Comrie It is certified that error appears in the above-identified patent and that said Letters Patent is hereby corrected as shown below:

Title Page item [56] Related US Application Data, after "No. 6,869,473" insert: --which claims benefit of United States provisional application No. 60/444,274 filed 1/31/2003--

Col. 1, line 10, after "entirety" insert: --which claims benefit of United States provisional application No. 60/444,274 filed 1/31/2003--

Col. 9, line 53, "25%" should be --50%--

Col. 9, line 54, "5%" should be --10%--

Col. 9, line 54, "20%" should be --40%--

Col. 9, line 55, "60^ " should be --60%--

Col. 12, line 50, "MIX A" should be --MIX "A" --

Col. 12, line 63, "2%" should be --20%--.

Signed and Sealed this

Twentieth Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,141,112 B2  Page 1 of 1
APPLICATION NO. : 11/085478
DATED : November 28, 2006
INVENTOR(S) : Douglas C. Comrie It is certified that error appears in the above-identified patent and that said Letters Patent is hereby corrected as shown below:

Title Page item [56] Related US Application Data, after "No. 6,869,473" insert: --which claims benefit of United States provisional application No. 60/444,274 filed 1/31/2003--

Col. 1, line 10, after "entirety" insert: --which claims benefit of United States provisional application No. 60/444,274 filed 1/31/2003--

Col. 9, line 53, "25%" should be --50%--

Col. 9, line 54, "5%" should be --10%--

Col. 9, line 54, "20%" should be --40%--

Col. 9, line 55, "60^" should be --60%--

Col. 12, line 50, "MIX A" should be --MIX "A"--

Col. 12, line 63, "2%" should be --20%--.

This certificate supersedes Certificate of Correction issued November 20, 2007.

Signed and Sealed this

Twenty-fifth Day of December, 2007

JON W. DUDAS
*Director of the United States Patent and Trademark Office*